United States Patent
Karadayi

(10) Patent No.: US 10,425,616 B2
(45) Date of Patent: Sep. 24, 2019

(54) HUB AND DETACHABLE HEAD FOR TELE-PRESENCE SYSTEM

(71) Applicant: Sony Interactive Entertainment LLC, San Mateo, CA (US)

(72) Inventor: Yeliz Karadayi, San Jose, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 15/887,574

(22) Filed: Feb. 2, 2018

(65) Prior Publication Data
US 2019/0246063 A1  Aug. 8, 2019

(51) Int. Cl.
*H04N 7/14* (2006.01)
*H04N 5/225* (2006.01)
*G03B 17/56* (2006.01)
*H04N 7/15* (2006.01)

(52) U.S. Cl.
CPC .......... *H04N 7/142* (2013.01); *G03B 17/561* (2013.01); *H04N 5/2253* (2013.01); *H04N 7/15* (2013.01)

(58) Field of Classification Search
CPC combination set(s) only.
See application file for complete search history.

(56) References Cited

U.S. PATENT DOCUMENTS

| 7,435,019 B2 * | 10/2008 | Lee | G03B 17/02 348/373 |
| 8,325,229 B2 * | 12/2012 | Jones | G03B 17/00 348/143 |
| 2006/0269278 A1 * | 11/2006 | Kenoyer | F16M 11/10 396/428 |

OTHER PUBLICATIONS

Karadayi, Yeliz, "Robot Interaction with a Tele-Presence System," U.S. Appl. No. 15/866,358, filed Jan. 9, 2018, Specification, Claims, Abstract, and Drawings, 47 pages.

* cited by examiner

*Primary Examiner* — Maria El-Zoobi
(74) *Attorney, Agent, or Firm* — Carr & Ferrell LLP

(57) ABSTRACT

The disclosure provides tele-presence devices for spatial communication in a tele-presence system. In particular, the present technology provides a tele-presence device having a camera system wirelessly, communicatively, and rotationally coupled to a hub. The hub includes an upper housing having an aperture for removably receiving the camera system, and a lower housing rotatable coupled to the upper housing. The hub further includes first and second rotational assemblies, and a controller, for operatively rotating and otherwise repositioning the camera system. The hub frictionally engages the camera system, such that the camera system is selectively detachable from the hub without any manipulation of the hub itself. That is, a user may lift the camera system out of the hub, which advantageously allows the camera system to be portable and easily docked to the hub or other hubs.

17 Claims, 16 Drawing Sheets

PRESENT USER(S)

REMOTE USER(S)

HUB AND DETACHABLE HEAD FOR TELE-PRESENCE SYSTEM

FIELD

The present technology relates generally to tele-presence systems, and more particularly to robotic tele-presence devices.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Tele-presence systems attempt to imitate face-to-face communication between two or more remote users. Conventionally, services such as video conferencing have become widely popular forms of communicating over vast distances. Current tele-presence systems typically work though a two-dimensional screen which displays a live video signal of each user. Face-to-face communication, however, includes a plurality of various forms of engagement, including body language and spatial awareness in addition to conveying verbal and otherwise non-verbal information. While users may wish to communicate by pointing at things, gesturing, or talking with their hands, it is difficult to validate or communicate such forms of communication through traditional two-dimensional systems.

Furthermore, traditional tele-presence devices rigidly integrate the camera to the body of the tele-presence device, preventing the camera from being used with multiple tele-presence devices or repositioned by a local user. This may create difficulties when a local user wishes to show a remote user a nearby location or object, but the tele-presence device neither has the mobility nor the degree of visibility to capture the location or object within its field of view.

Accordingly, there is a need for a tele-presence system which allows users to feel a stronger sense of successful communication and to communicate spatially.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to tele-presence devices for spatial communication in a tele-presence system. Exemplary tele-presence devices may include a camera system; and a hub, communicatively coupled to the camera system, having: servo motors configured to rotate the camera system; and an aperture, the camera system being selectively detachable from the aperture.

In further embodiments, an exemplary tele-presence device may include: a camera system having a camera housing; a hub communicatively and rotationally coupled to the camera system, the hub comprising: (i) an upper housing having an aperture for removably receiving the camera housing; (ii) a lower housing rotatable coupled to the upper housing; (iii) a first rotational assembly having a first servo motor; and (iv) a second rotational assembly having a second servo motor; and a controller that transmits control signals to the first and the second servo motors.

In various embodiments, the present disclosure is directed to a tele-presence device having a camera system; a hub communicatively and rotationally coupled to the camera system, the hub comprising: (i) an upper housing having an aperture for removably receiving the camera system; (ii) a lower housing rotatable coupled to the upper housing; (iii) a first rotational assembly having a first servo motor configured to drive rotation of a spindle, the spindle being frictionally engaged with camera system to facilitate rotation of the camera system about a horizontal axis; and (iv) a second rotational assembly having a second servo motor configured to drive rotation of the upper housing with respect to the lower housing, the aperture being rotationally and frictionally engaged with the camera system to facilitate rotation of the camera system about a vertical axis; and a controller that transmits control signals to the first and the second servo motors.

BRIEF DESCRIPTION OF THE DRAWINGS

Embodiments are illustrated by way of example, and not by limitation in the figures of the accompanying drawings, in which like references indicate similar elements.

DETAILED DESCRIPTION

Figure 1:
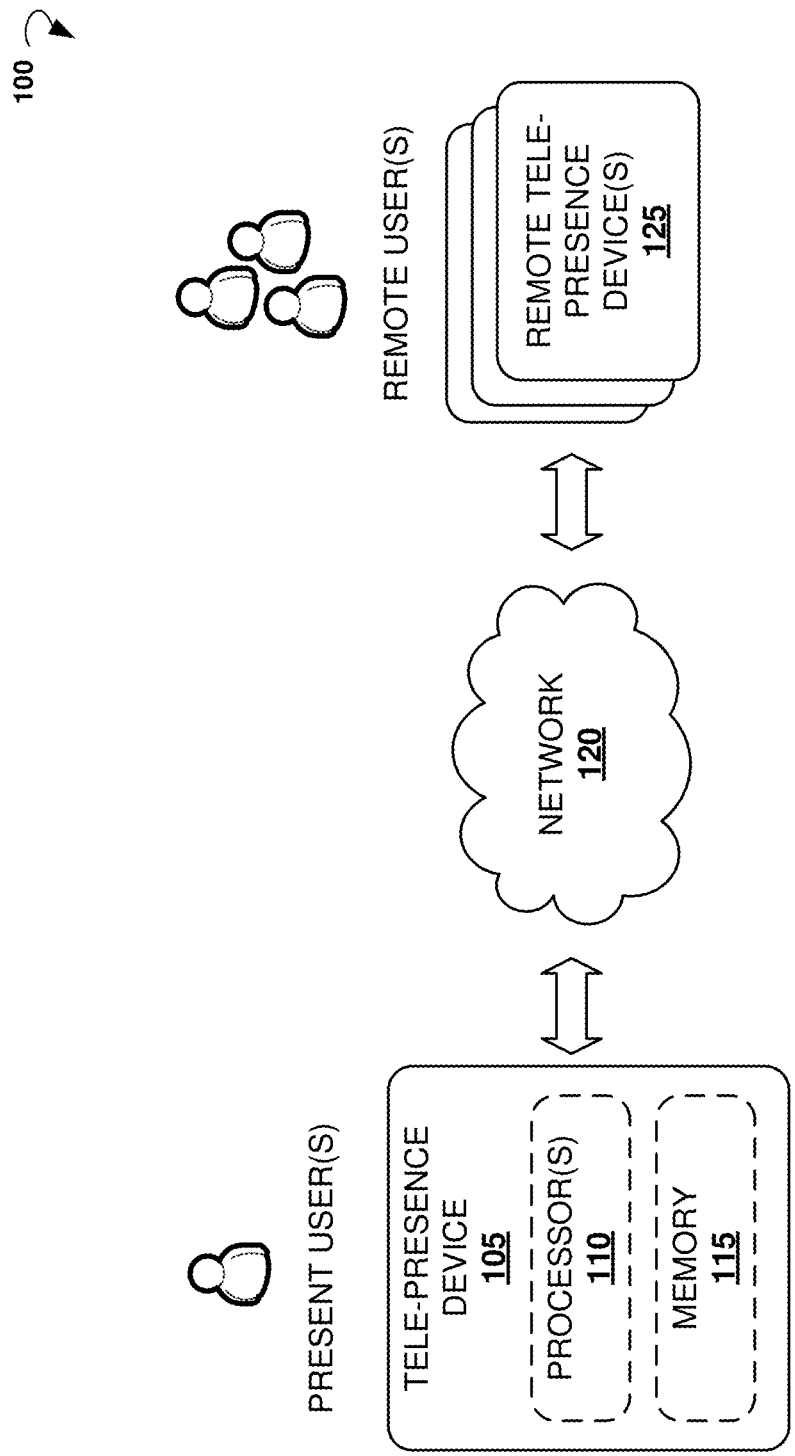
FIG. 1 shows an example system architecture of a tele-presence system, in accordance with an embodiment of the present disclosure.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

In general, various embodiments of the present disclosure are directed to a robotic system, otherwise referred to as a "tele-presence device," having a camera system, otherwise referred to as a "head," detachably coupled to a hub, otherwise referred to as a "body." In general, the hub is configured to rotate the camera system with at least two degrees of freedom. In some embodiments, these two degrees of freedom include rotation about a first vertical axis and rotation about a second horizontal axis. The hub may include an upper housing having an aperture for removably receiving the camera system, and a lower housing rotatable coupled to the upper housing. The hub further includes first and second rotational assemblies, and a controller, for operatively rotating and otherwise repositioning the camera system. Advantageously, the hub is capable of repositioning the camera system while also allowing a user to lift the camera system out of the hub simply by picking the camera system up.

The techniques of the embodiments disclosed herein can be implemented using a variety of technologies. For example, the methods described herein are implemented in software executing on a computer system or in hardware utilizing either a combination of microprocessors or other specially designed application-specific integrated circuits (ASICs), programmable logic devices, or various combinations thereof. In particular, the methods described herein are implemented by a series of computer-executable instructions residing on a storage medium such as a disk drive, or computer-readable medium. It should be noted that methods disclosed herein can be implemented by a cellular phone, smart phone, computer (e.g., a desktop computer, tablet computer, laptop computer), game console, handheld gaming device, and so forth.

The following detailed description of embodiments includes references to the accompanying drawings, which form a part of the detailed description. Note, the features, structures, or characteristics of embodiments described herein may be combined in any suitable manner in one or more implementations. In the instant description, numerous specific details are provided, such as examples of programming, software modules, user selections, network transactions, hardware modules, hardware circuits, hardware chips, and so forth, to provide a thorough understanding of embodiments. One skilled in the relevant art will recognize, however, that the embodiments can be practiced without one or more of the specific details, or with other methods, components, materials, and so forth. In other instances, well-known structures, materials, or operations are not shown or described in detail to avoid obscuring aspects of the disclosure.

Embodiments of this disclosure will now be presented with reference to accompanying drawings which show blocks, components, circuits, steps, operations, processes, algorithms, and the like, collectively referred to as "elements" for simplicity. These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. One or more processors in the processing system may execute software, firmware, or middleware (collectively referred to as "software"). The term "software" shall be construed broadly to mean processor-executable instructions, instruction sets, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." The term "or" is used to refer to a nonexclusive "or," such that "A or B" includes "A but not B," "B but not A," and "A and B," unless otherwise indicated.

Referring now to the drawings, example embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 shows an example system architecture of a tele-presence system 100 for facilitating personal and spatial communication between one or more present users and one or more remote users. In various embodiments, the tele-presence system 100 includes a tele-presence device 105 and one or more remote tele-presence devices 125. The tele-presence device 105 includes one or more processors 110 and memory 115. In one example, the tele-presence device 105 is a robotic system. In some embodiments, the one or more remote tele-presence devices 125 are robotic systems, personal computers, tablets, mobile devices, or other suitable computing devices.

The aforementioned elements of the tele-presence system 100 are operatively coupled to one another via one or more communication networks 120, as shown in FIG. 1. Communication networks 120 can be any of wired or wireless (radio or optical) communication methods. For example, communication networks 120 include the Internet, cellular networks, Ethernet-based networks, satellite networks, or other suitable networks. Moreover, the communication networks 120 may include any number of intermediary servers or other processors which may perform some or all of the processing done by the tele-presence devices described herein.

Figure 2:
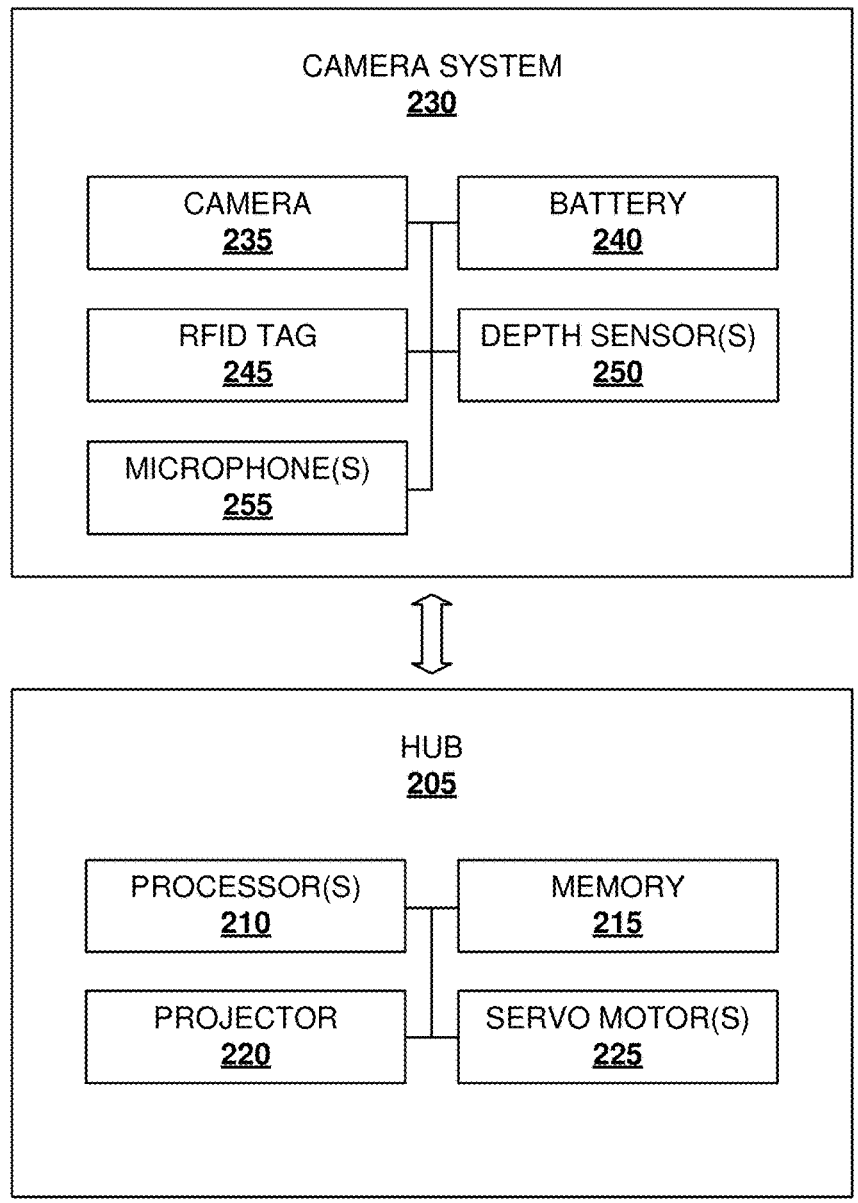
FIG. 2 illustrates an example system architecture of a tele-presence device, in accordance with an embodiment of the present disclosure.

FIG. 2 illustrates an example system architecture of a tele-presence device 200. In some embodiments, the tele-presence device 200 includes a hub 205 and a camera system 230. The hub 205 and camera system 230 may be communicatively coupled via a wired or wireless connection.

The hub 205 may have one or more processors 210, a memory 215, and one or more servo motors 225. The hub 205 may optionally include a projector 220. The one or more processors 210 may be communicatively coupled to the memory 215, projector 220, servo motors 225, and the camera system 230. In various embodiments, the servo motors 225 are configured to operatively position and/or orient the camera system 230. It is to be understood that other types of actuators may similarly be used in place of servo motors 225, such as linear actuators, stepper motors, and the like.

In one or more embodiments, the camera system 230 includes a camera 235, a battery 240, an RFID tag 245, and one or more depth sensors 250. The camera 235 may be configured to record a video signal and transmit the video signal to the hub 205. Likewise, the one or more depth sensors 250 may be configured to generate depth data indicative of the distance from the camera system 230 of a physical environment, and to transmit the depth data to the hub 205. The RFID tag 245 may transmit a user identifier associated with a user or a group of users, as will be described in greater detail herein. The camera system 230 may further include one or more accelerometers or inertial measurement units (IMU). It is to be understood that the camera system 230 may be comprised by any combination or subset of the above recited elements.

It is to be understood that the elements of the tele-presence device 200 shown in FIG. 2 may be disposed within and coupled to the hub 205, camera system 230, or both. For example, while the projector 220 is shown as a part of the hub 205, in some embodiments the projector 220 is integrated into the camera system 230. Likewise, while the depth sensor 250 and microphone 255 are shown as a part of the camera system 230, in some embodiments the depth sensor 250 and/or microphone 255 are integrated into the hub 205. Advantageously, the arrangement of components may shift expense between the camera system 230 and the hub 205, which allows the portable camera system 230 to be cheaper, have less onboard processing power, etc.

Figure 3:
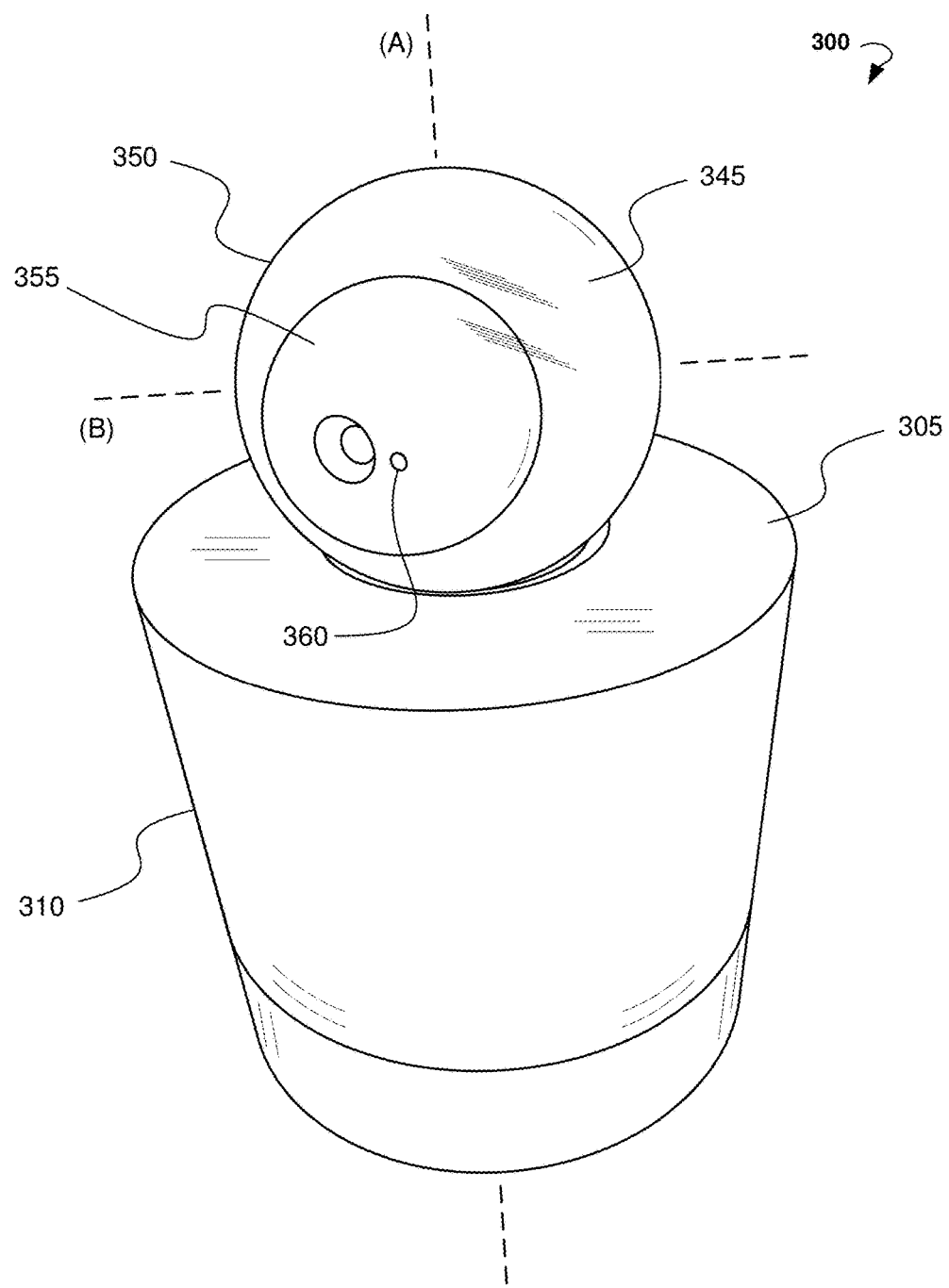
FIGS. 3-4 are front perspective views of an exemplary tele-presence device having a hub and a camera system, in accordance with an embodiment of the present disclosure.
Figure 4:
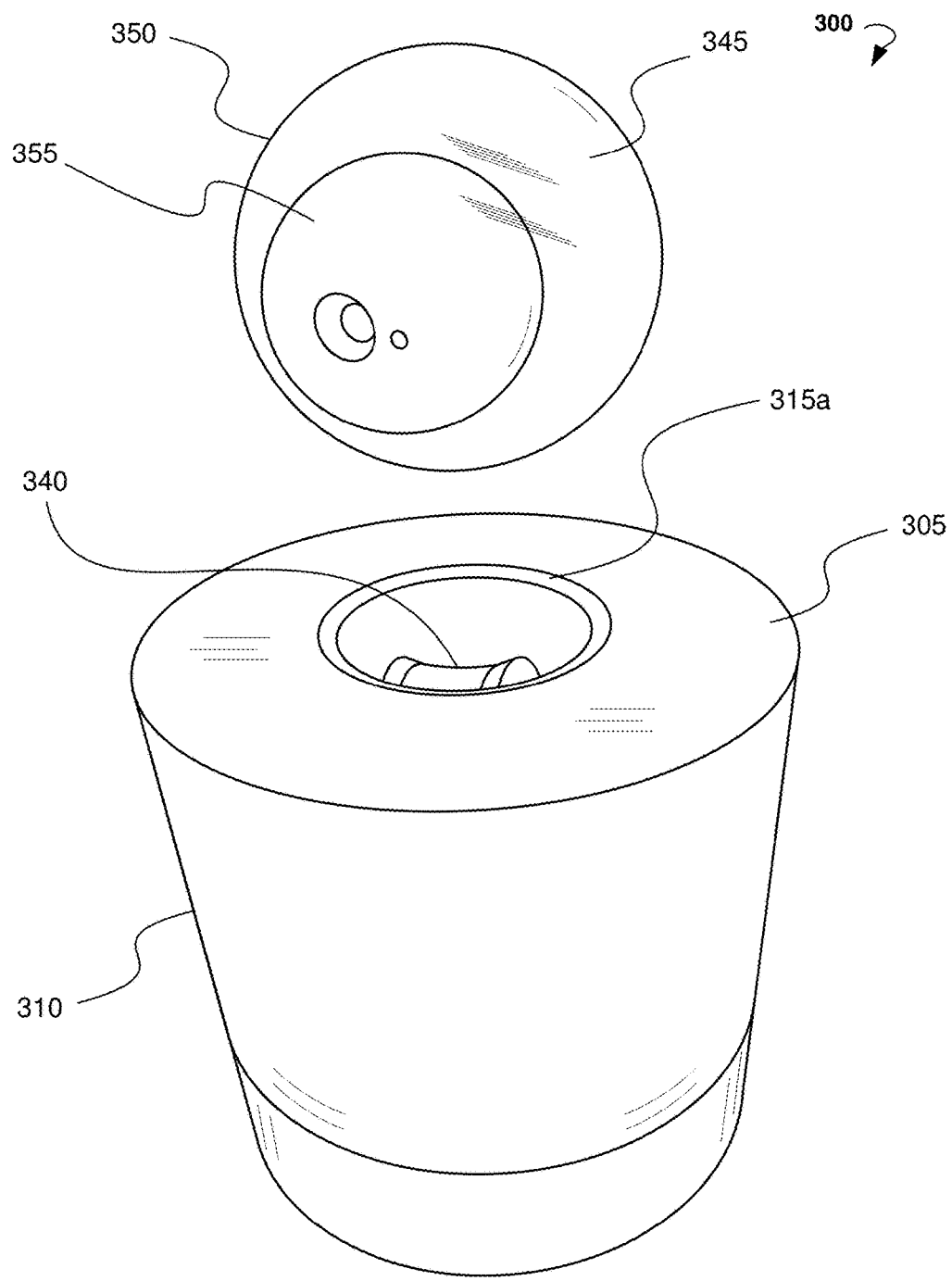
Figure 5:
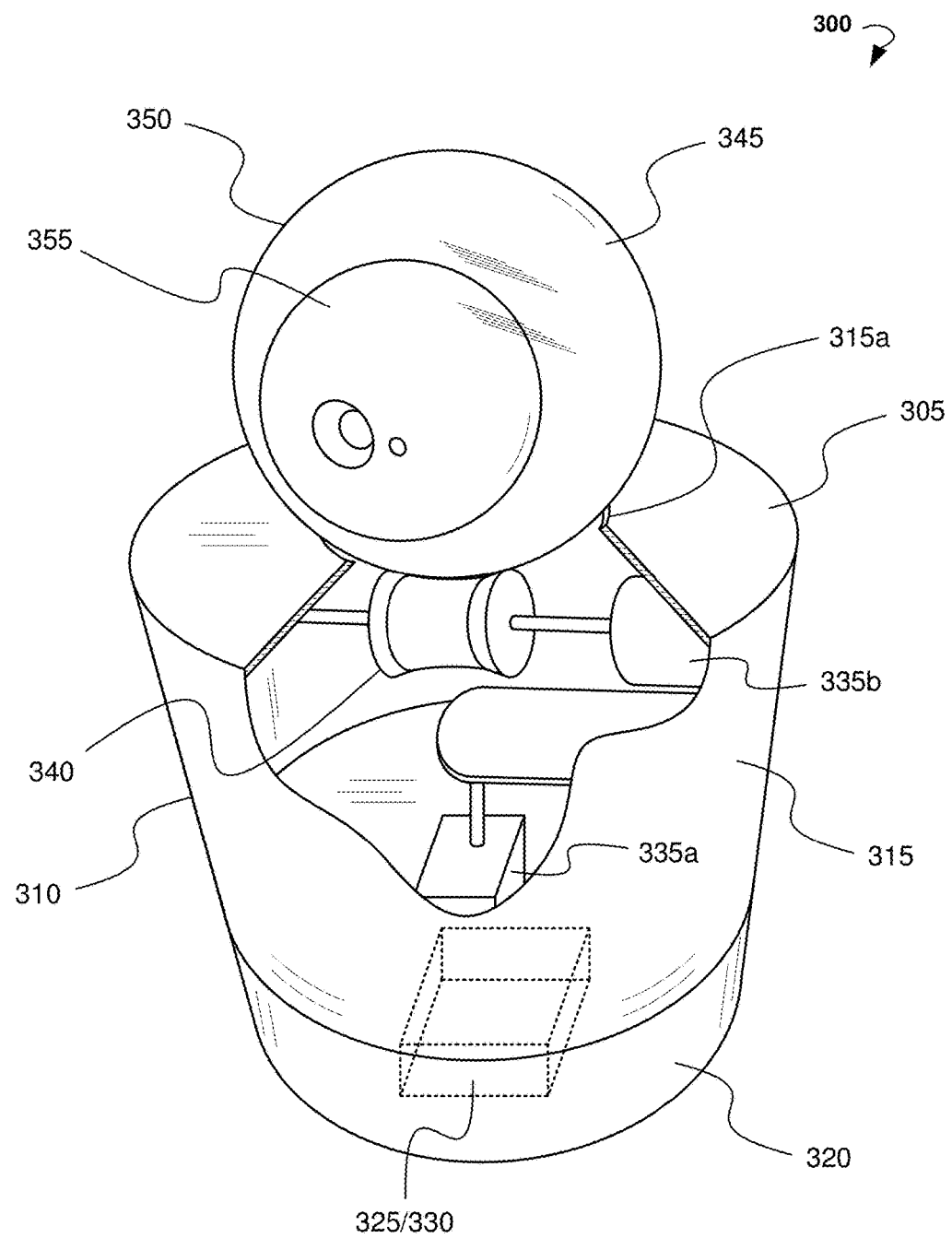
FIG. 5 is a front perspective view of the exemplary tele-presence device of FIGS. 3-4 with a cutaway of the hub.

FIGS. 3-5 are front perspective views of an exemplary tele-presence device 300 having a hub 305 and a camera system 345, in accordance with some embodiments of the present disclosure. The hub 305 includes a housing 310, one or more processors and memory (collectively labeled 325/330), and servo motors 335a, 335b. The housing 310 may have an upper housing 315 and a lower housing 320. In certain embodiments, the upper housing 315 is rotatably coupled to the lower housing 320.

The servo motors 335a, 335b are configured to rotate the camera system 345. In some exemplary embodiments, servo motor 335a is coupled to and rotates the upper housing 315. Aperture 315a of the upper housing 315 securely receives the camera system 345 such that the camera system 345 and the upper housing 315 are rotationally and frictionally engaged (i.e., when the upper housing 315 rotates, the camera system 345 rotates along a first axis (A)). In various embodiments, servo motor 335b is coupled to and rotates a spindle 340. The camera system 345 may be frictionally engaged with the spindle 340 such that, when the spindle 340 rotates, the camera system 345 rotates along a second axis (B) orthogonal to the first axis (A).

FIG. 4 illustrates that the camera system 345 may be removed from the hub 305 by simply lifting the camera system 345 out of the aperture 315a. In various embodiments, the camera system 345 has no direct attachments to the hub 305, but is rotated and otherwise moved through frictional engagement. It is to be understood that other rotational mechanisms may be used, such as a gear system or other suitable rotational engagement between the hub and the camera system 345. The camera system 345 may also be communicatively coupled to other hubs by placing the camera system 345 onto the hubs, such as in the aperture 315a. The camera system 345 may include a housing 350, a camera 355, and a depth sensor 360.

Figure 6:
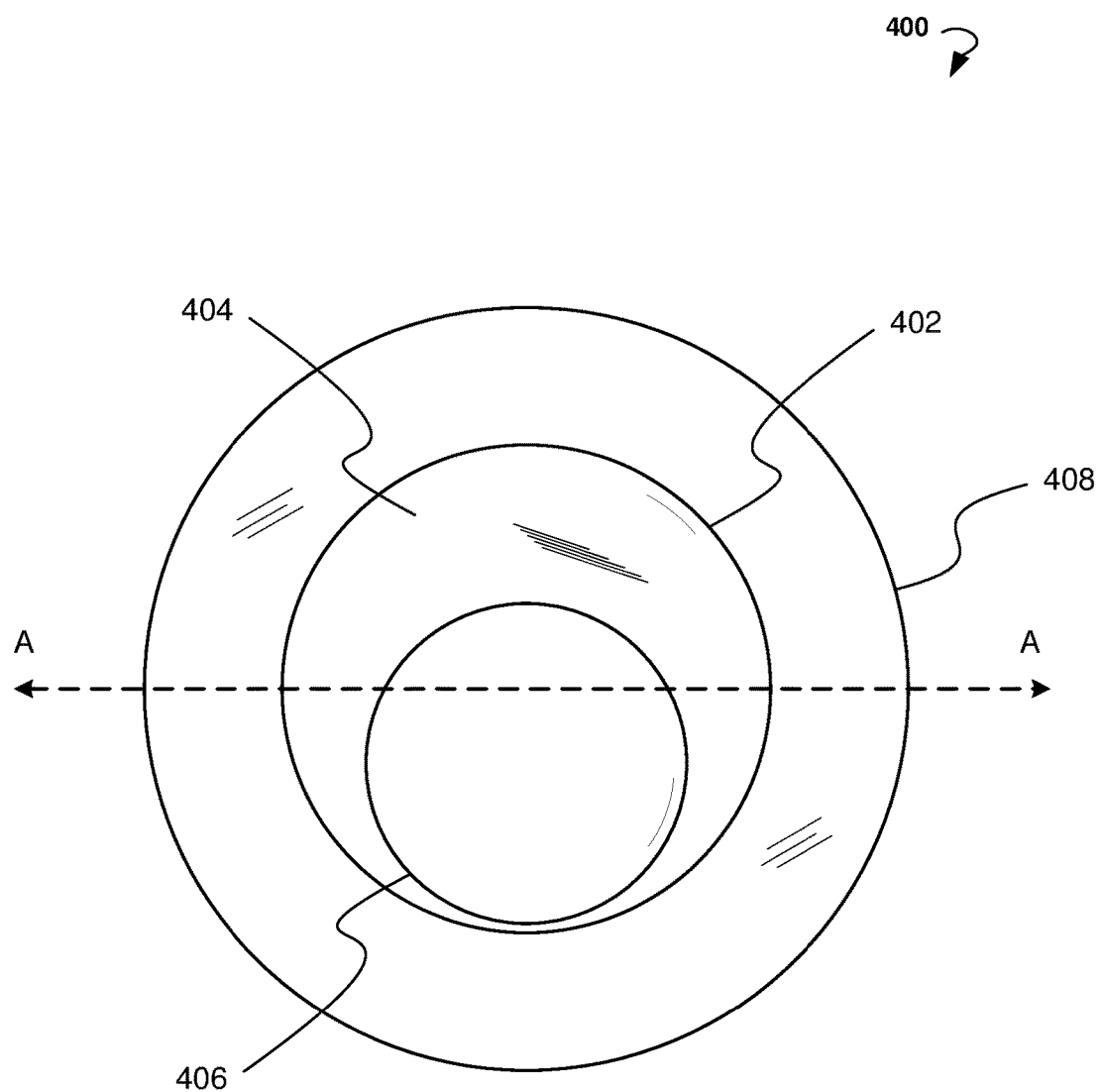
FIG. 6 is a top view of a further exemplary tele-presence device, in accordance with an embodiment of the present disclosure.

FIGS. 6-10 depict another exemplary tele-presence device 400 according to the present disclosure. FIG. 6 depicts a top view of the tele-presence device 400 having a camera system 402 and a hub 408. The camera system 402 and hub 408 may include one or more components of camera systems and hubs described in FIGS. 2-5. For example, the camera system 402 includes a camera 406 and a camera housing 404.

Figure 7:
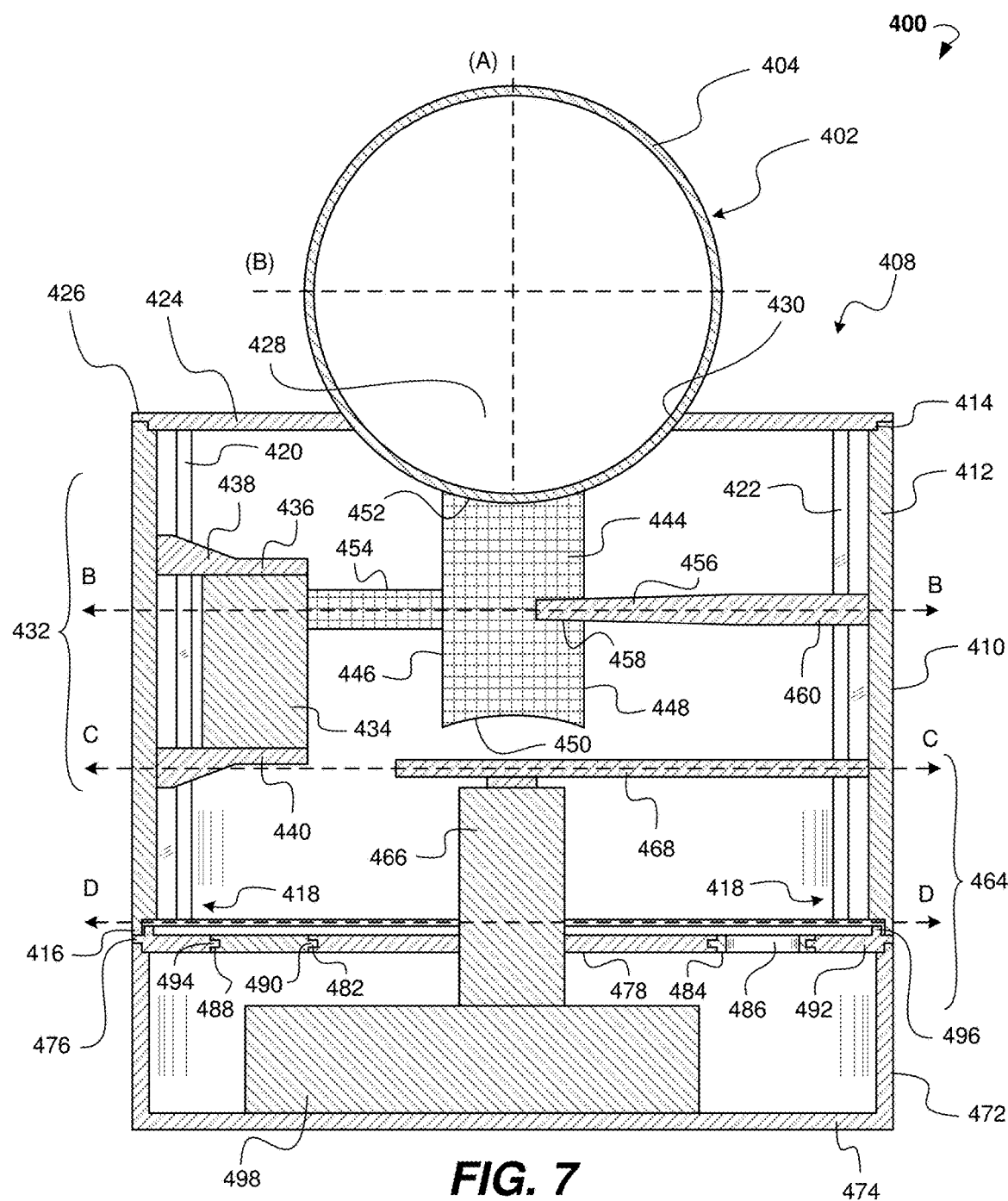
FIG. 7 is a front cross-section view of the tele-presence device about line A-A in FIG. 6.

FIG. 7 illustrates a detailed front cross-section view of the tele-presence device 400 about line A-A in FIG. 6. As shown, the hub 408 includes an upper housing 410, a lower housing 472, a first rotational assembly 432, a second rotational assembly 464, and a controller 498. As will be described in greater detail, hub 408 is operatively configured to rotate the camera system 402 about two independent axes, a first, vertical axis (A) and a second, horizontal axis (B). The hub 408 frictionally engages the camera system 402, such that the camera system 402 is detachable from the hub 408 without any manipulation of the hub 408 itself. That is, according to the subject disclosure, a user may lift the camera system 402 out of the hub 408, which advantageously allows the camera system 402 to be portable and easily docked to the hub 408 or other hubs. It is to be understood that the internal components of the camera system 402, as well as any wires that may communicatively couple the controller 498 and the first and second servo motors 434, 466, are not shown for ease of illustration.

The upper housing 410 may be constructed to include a cylindrical side wall 412 whose upper end terminates at a lid 424. Just below an outwardly projecting lip 426 of the lid 424, an abutment 414 may be provided to securely receive the lid 424 and nest the lid 424 onto an upper portion of the cylindrical side wall 412. In some embodiments, an aperture 428 is disposed in the lid 424 to receive a portion of the camera system 402. A curved ledge 430 may extend radially inward into the aperture 428 to support the camera system 402. The curved ledge 430 may include a curvature which matches a curvature of an outer surface of the camera system housing 404. The curved ledge 430 provides frictional engagement with the camera system housing 404 to rotate the camera system 402 about the first axis (A).

The cylindrical side wall 412 may further include a rail system 418, depicted by a first set of rails 420 and a second set of rails 422, which will be described in greater detail in relation to FIGS. 8 and 9. Furthermore, a lower rim 416 may be provided at an open lower end of the cylindrical side wall 412. In some embodiments, the lower rim 416 abuts against an upper surface of a lid 476 of the lower housing 472, which may shift weight away from the second servo motor 466. Since the upper housing 410 rotates with respect to the lower housing 472, the lower rim 416 will also rotate over the upper surface of the lid 476. A gap may alternatively be provided between the lower rim 416 and the lid 476.

The first rotational assembly 432 includes a first servo motor 434 and a spindle 444. The spindle 444 is constructed in the form of a wheel having first and second parallel faces 446, 448 coupled by a curved cylindrical surface 450. The curved cylindrical surface 450 includes an inwardly tapered curvature 452. As shown in cross-section in FIG. 7, the inwardly tapered curvature 452 may have a radius of curvature matching a radius of curvature of the camera system housing 404.

The spindle 444 is adapted to rotationally engage the camera system 402, such that the camera system 402 rotates along the second axis (B) in response to rotation of the spindle 444. While spindle 444 is shown to frictionally engage the camera system 402, the spindle 444 may otherwise rotationally engage with the camera system 402, such as with a geared system, magnets, or the like. While the camera system 402 is in contact with the lid 424 and spindle 444, in an engaged position, the camera system 402 is stable and resists unintended movement due to minor unrelated forces. Gravity keeps the camera system 402 in the engaged position, until a user lifts the camera system 402 out of the hub 408. As such, the camera system 402 is selectively detachable from the hub 408. As shown, tele-presence device 400 provides for a large degree of visibility. Furthermore, the removable aspect of the camera system 402 permits the user to pick up the camera system 402 and show different angles and aspects of the discussion.

The spindle 444 is operatively coupled to the first servo motor 434 via a first axel 454 rotationally connected to the first face 446. In one or more embodiments, the spindle 444 rotates about a second axel 456 along the same axis as the first axel 454. The second axel 456 may be provided in a blind hole 458 bore into the second face 448 of the spindle 444. While the camera system 402 is illustrated as having a spherical housing, the camera system 402 may similarly be cylindrical or other suitable shape.

The first servo motor 434 includes a motor mount 436 having an upper end 438 and a lower end 440. Each end 438, 440 secure the first servo motor 434 to the cylindrical side wall 412 via the first set of rails 420 of the rail system 418. A securing fastener (not shown) may be provided to vertically secure the motor mount 436 to prevent lateral movement along the first set of rails 420. The motor mount 436 may also be co-molded with the cylindrical side wall 412, or otherwise suitably attached to the upper housing 410.

Figure 8:
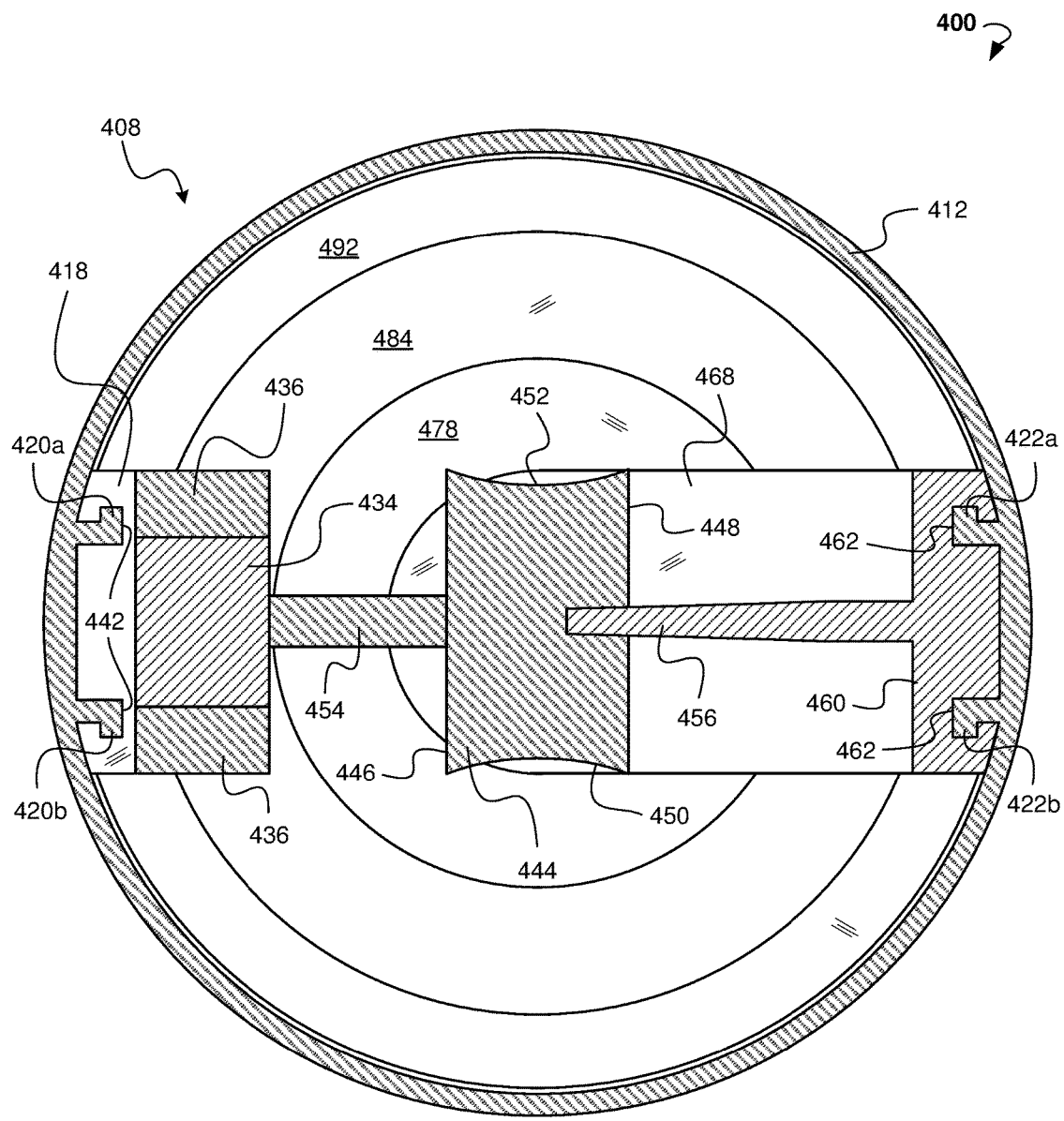
FIG. 8 is a top cross-section view of the tele-presence device about line B-B in FIG. 7.

FIG. 8 shows a top cross-sectional view of the hub 408 about line B-B in FIG. 7, illustrating the spindle 444 coupled to the first servo motor 434 and the rail system 418. As shown in greater detail, the upper end 438 (not shown in FIG. 8) and the lower end 440 of the motor mount 436 include a set of slots 442 which correspond in shape and size to the first set of rails 420. The set of slots 442 slidingly receive the first set of rails 420. Additionally, the second axel 456 may be secured to the second set of rails 422 via a mount 460. The mount 460 also includes a set of slots 462 which slidingly receive the second set of rails 422. The mount 460 may similarly be co-molded with the cylindrical side wall 412, or otherwise suitably attached to the upper housing 410. The first set of rails 420 may include a first and a second rail 420a, 420b, or any other suitable number of rails. Likewise, the second set of rails 422 may include a first and a second rail 422a, 422b.

Referring back to FIG. 7, the second rotational assembly 464 comprises a second servo motor 466 rotationally coupled to a rotational arm 468. The second rotational assembly 464 operatively rotates the upper housing 410 of the hub 408, and thus rotates the camera system 402, about the first axis (A). The second servo motor 466 drives the rotational arm 468 to rotate about the first axis (A).

Figure 9:
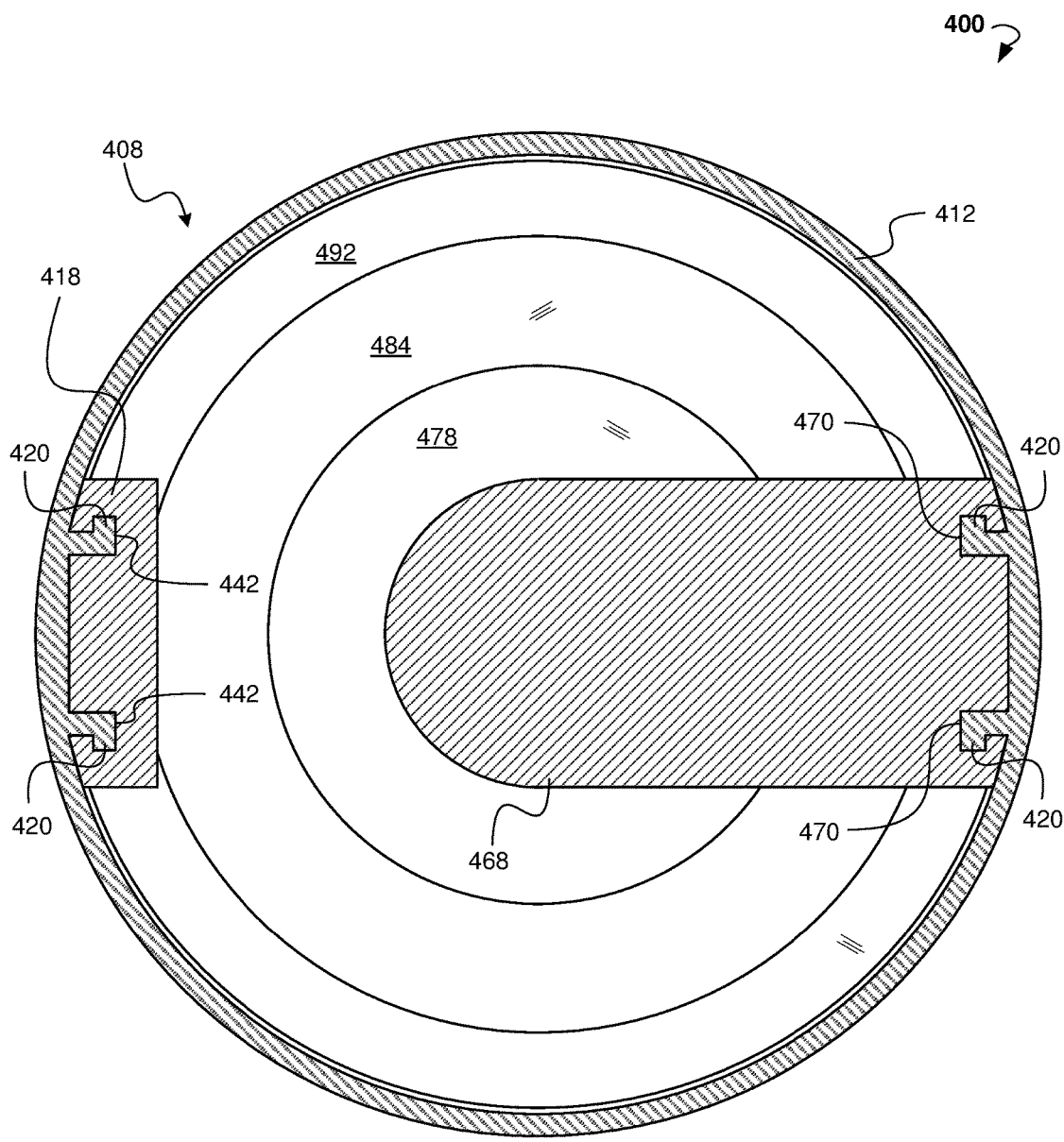
FIG. 9 is a top cross-section view of the tele-presence device about line C-C in FIG. 7.

FIG. 9 depicts a cross-sectional view of the hub 408 about line C-C in FIG. 7, illustrating a cross-section of the rotational arm 468 of the second rotational assembly 464. As shown, the rotational arm 468 is coupled to the cylindrical side wall 412 of the upper housing 410 via the second set of rails 422. The rotational arm 468 may include a set of slots 470 which are slidingly engaged to and receive the second set of rails 422. As such, in response to the driving force of the second servo motor 466, the upper housing 410 will rotate with the rotational arm 468.

The rail system 418 allows for easier assembly of the tele-presence system 400, and provides for dynamically adjusting the first and second rotational assemblies 432, 464. Furthermore, in the case of the second rotational assembly 464, the second set of rails 422 provides the rotational arm 468 a degree of freedom to slide along a length of the second set of rails 422. Advantageously, weight from the upper housing 410 and any internal components does not bear down on the rotational arm 468 (or the second servo motor 466), but instead onto the lower housing 472. It is to be understood that a securing fastener (not shown) may alternatively be provided to vertically secure the rotational arm 468 to prevent lateral movement along the second set of rails 422.

In various embodiments, the controller 498 transmits control signals to the first and second servo motors 434, 466 to facilitate rotational movement of the camera system 402. The controller 498 may further be wirelessly and communicatively coupled to the camera system 402, as further described in related U.S. patent application Ser. No. 15/866,358 entitled "Robot Interaction with a Tele-Presence System," filed Jan. 9, 2018, which is incorporated by reference herein for all purposes.

Figure 10:
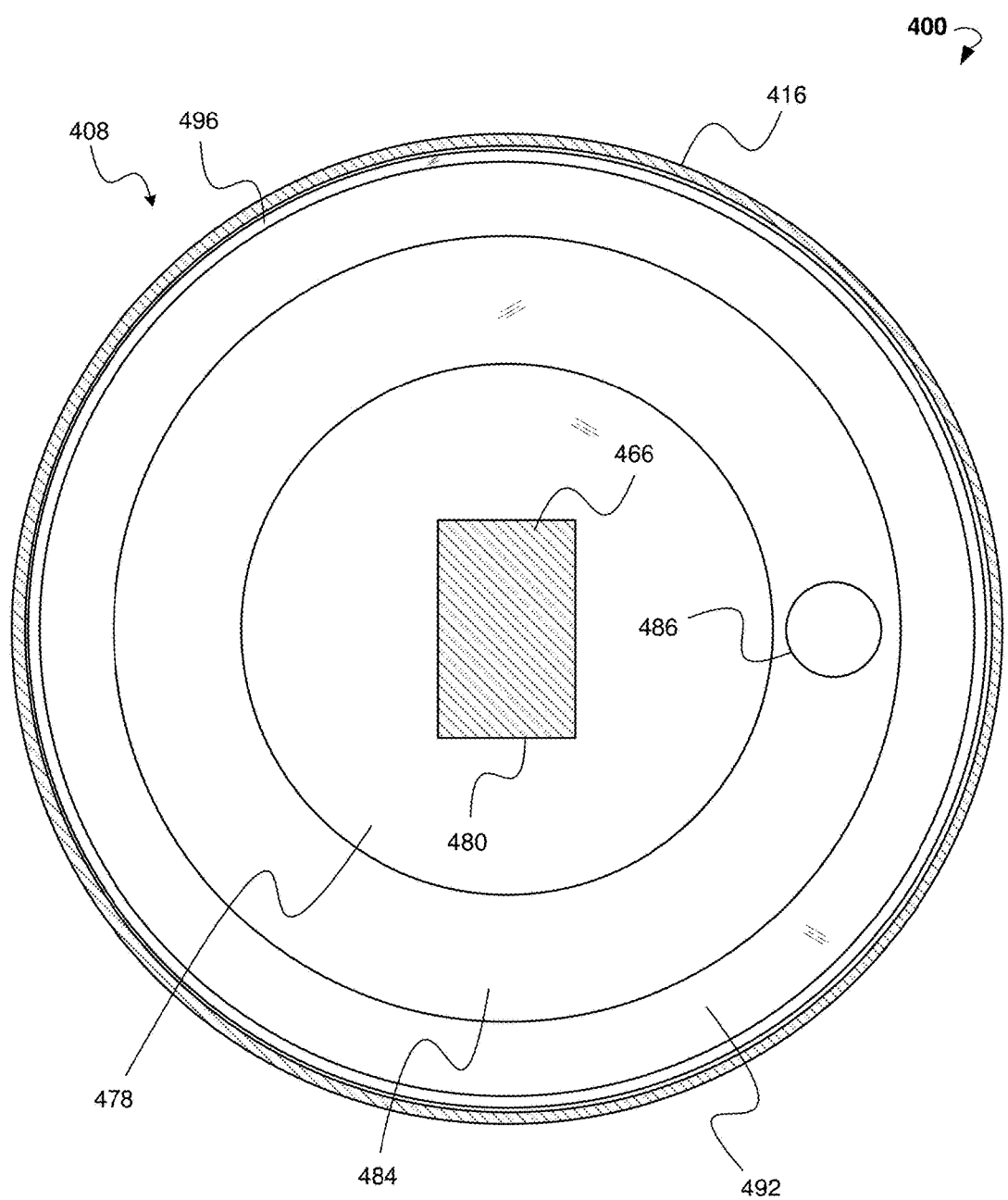
FIG. 10 is a top cross-section view of the tele-presence device about line D-D in FIG. 7.

FIG. 10 is a further cross-sectional view of the hub 408 about line D-D in FIG. 7, illustrating the lid 476 of the lower housing 472. The lid 476 may be coupled to a base 474 of the lower housing 472. In one or more embodiments, the lid 476 includes an inner portion 478, an outer portion 492, and an intermediate ring 484 disposed concentrically between the inner portion 478 and outer portion 492. The inner portion 478 may have an aperture 480 in which the second servo motor 466 is disposed. As shown, the intermediate ring 484 includes an aperture 486 through which wires may be routed from the lower housing 472 to the upper housing 410. In particular, wires may need to pass from the lower housing 472 to the first and second servo motors 434, 466 in the upper housing 410.

Since the upper housing 410 rotates with respect to the lower housing 472, wires passing through the lid 476 may get caught if the upper housing 410 rotates through too high of a degree of rotation. As shown in the present embodiment, the intermediate ring 484 rotates independently of the upper and lower housing 410, 472, which advantageously allows the wires to move freely during rotation.

Referring back to FIG. 7, the intermediate ring 484 may include an annular groove 488 and an annular lip 490 that facilitate coupling the intermediate ring 484 to the outer portion 492 and inner portion 478 of the lid 476, respectively. The annular groove 488 matingly interlocks with an annular lip 494 of the outer portion 492. The annular lip 490 similarly matingly interlocks with an annular groove 482 of the inner portion 478. While not shown, tolerances may be provided between the grooves and lips for manufacturing purposes. As shown, the interlocking of the intermediate ring 484 and the inner and outer portions 478, 492 of the lid 476 allow the intermediate ring 484 to freely rotate about the first axis (A) while constraining lateral movement along the first axis (A). Furthermore, the lid 476 may include an outer concentric rim 496 concentrically disposed within the lower rim 416 of the upper housing 410. It is to be understood that all annular or concentric components, such as the annular groove 488 and annular lip 490, may be continuous, constructed as a series of concentric tabs, or other suitable construction. It is to be further understood that the location of the grooves and lips may be reversed, or in any suitable combination for facilitating the rotational freedom of the intermediate ring 484.

Figure 11:
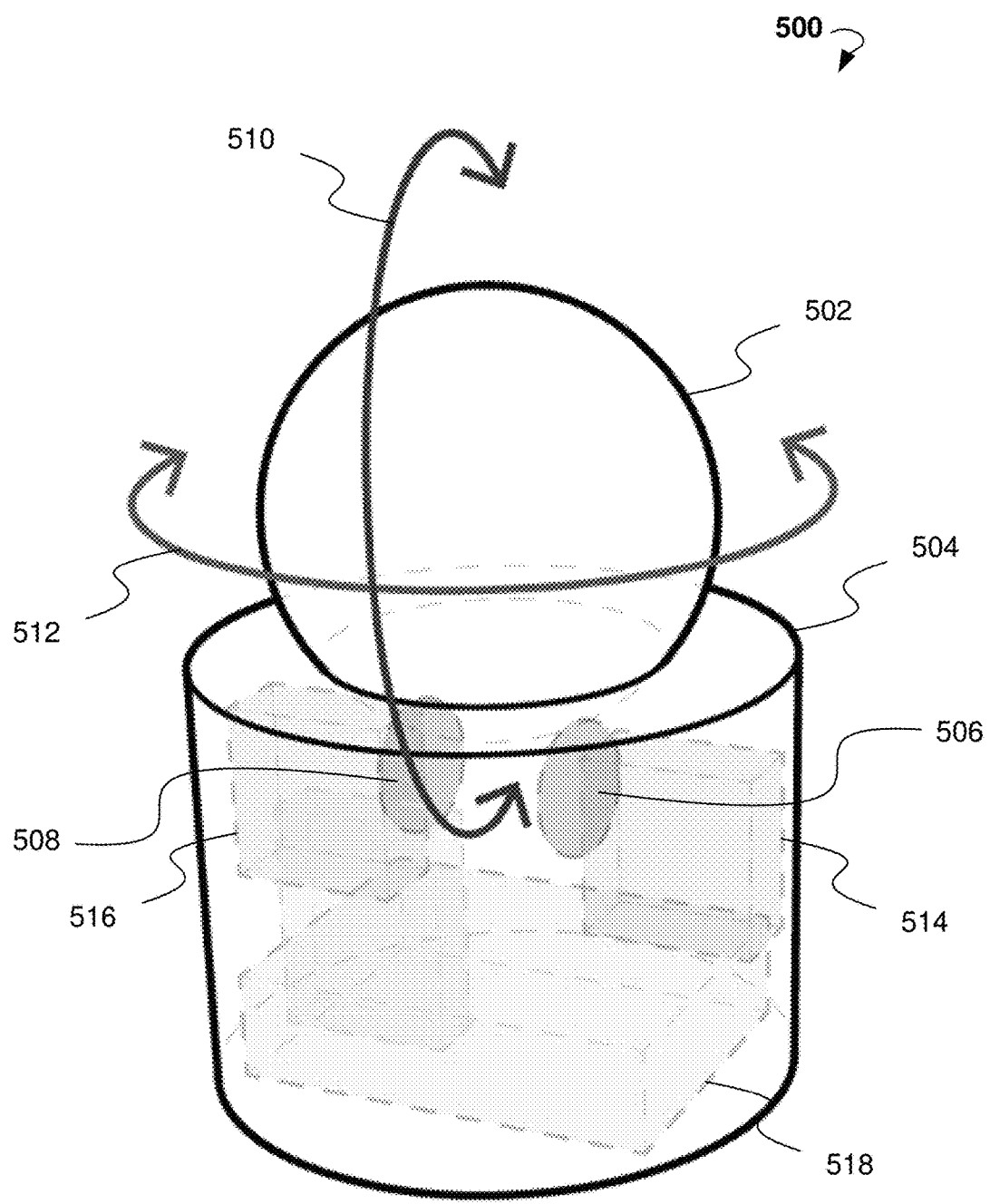
FIG. 11 shows an additional exemplary tele-presence device having two independently rotatable wheels to facilitate movement of a camera system, in accordance with an embodiment of the present disclosure.

FIG. 11 depicts an exemplary architecture of a tele-presence device 500 having two independently rotatable wheels 506, 508 to facilitate movement 510, 512 of a camera system 502. The camera system 502 is selectively detachable from a hub 504, which includes servo motors 514, 516 to drive the independent wheels 506, 508, respectively. By rotating, via transmitted control signals to the servo motors 514, 516, each independent wheel 506, 508 through different degrees of rotation, a controller 518 operatively may reposition the camera system in any direction and orientation.

Figure 13:
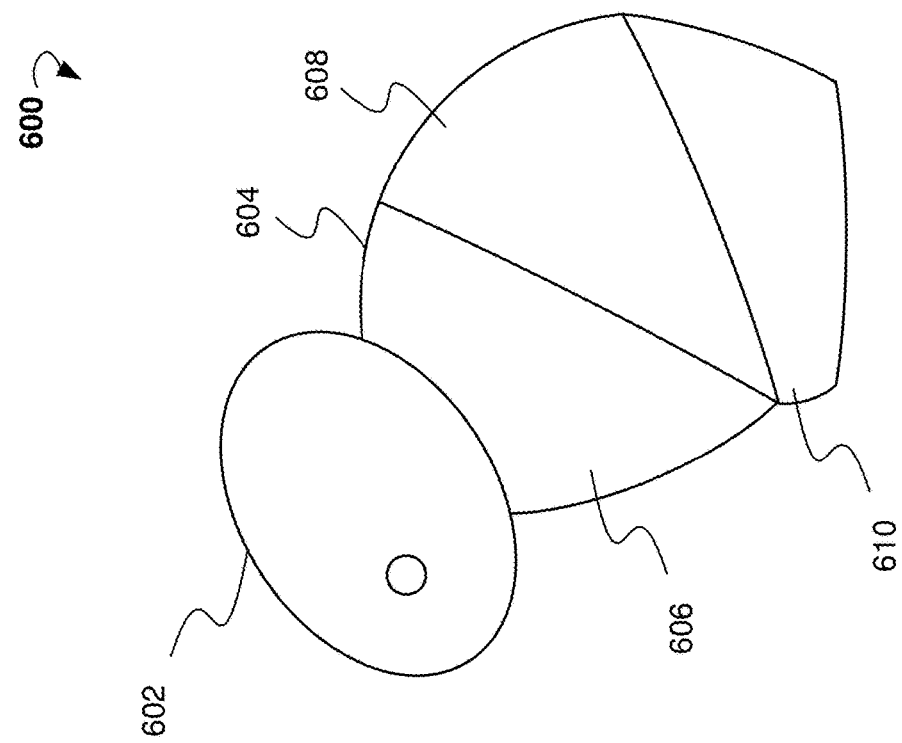
FIGS. 12-13 illustrate a further additional exemplary tele-presence device, in accordance with an embodiment of the present disclosure.
Figure 12:
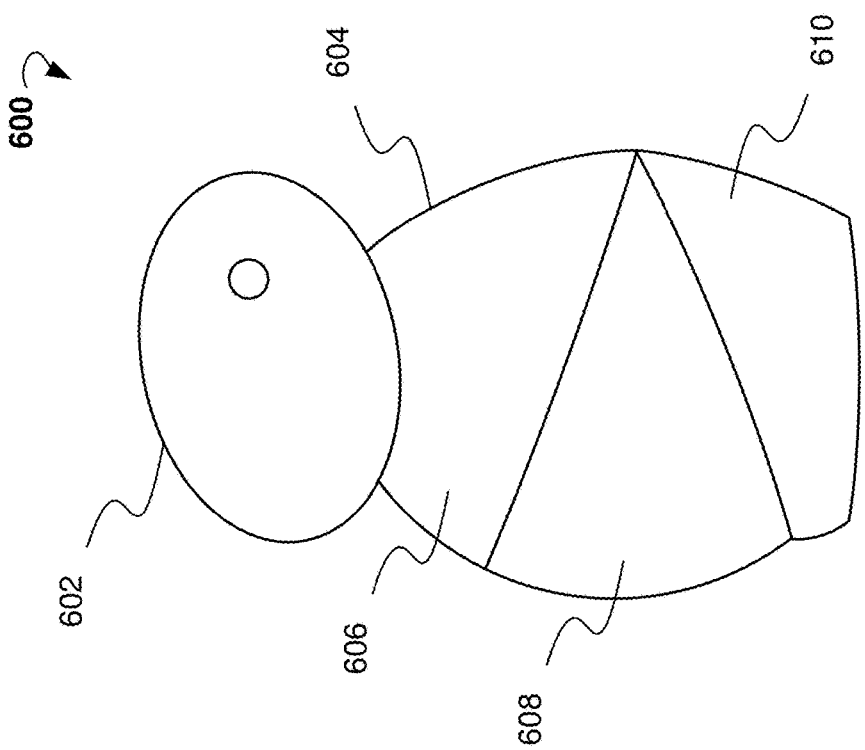

FIGS. 12-13 illustrate a further exemplary tele-presence device 600, in accordance with an embodiment of the present disclosure. The tele-presence device 600 may include a hub 604 having an upper housing 606, intermediate housing 608, and lower housing 610. One or more motors (not shown) may be provided to rotate the upper housing 606 with respect to the intermediate housing 608, and likewise to rotate the intermediate housing 608 with respect to the lower housing 610. Since a first plane of rotation disposed between the upper and intermediate housings 606, 608 is not parallel to a second plane of rotation disposed between the intermediate and lower housings 608, 610, the tele-presence device 600 may provide an undulating motion to reposition the camera system 602. The camera system 602 may be coupled to the hub 604 with any suitable coupling as described in the present disclosure.

Figure 14:
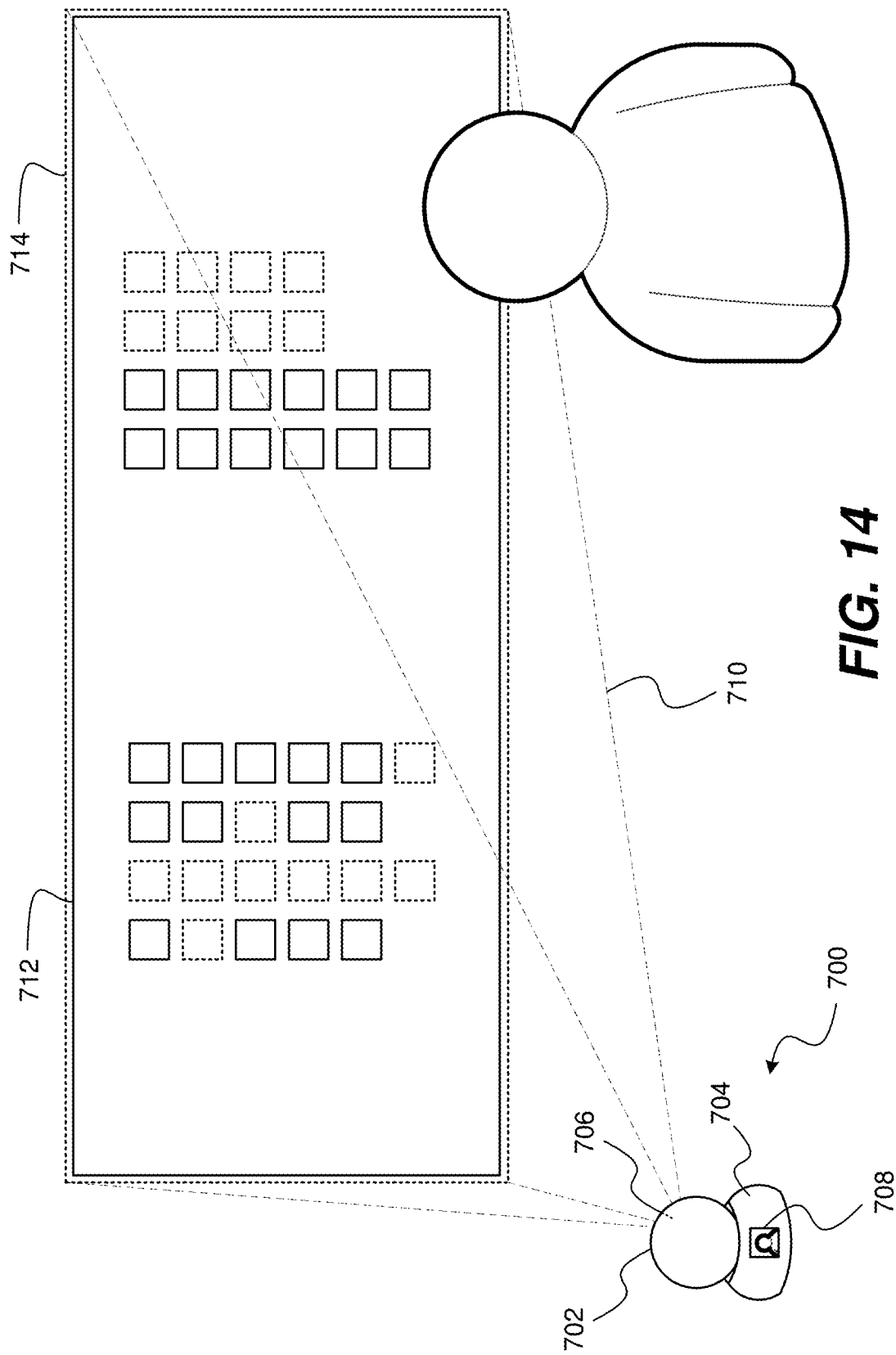
FIGS. 14-16 depict another exemplary tele-presence device having a projector and a display, in accordance with an embodiment of the present disclosure.
Figure 15:
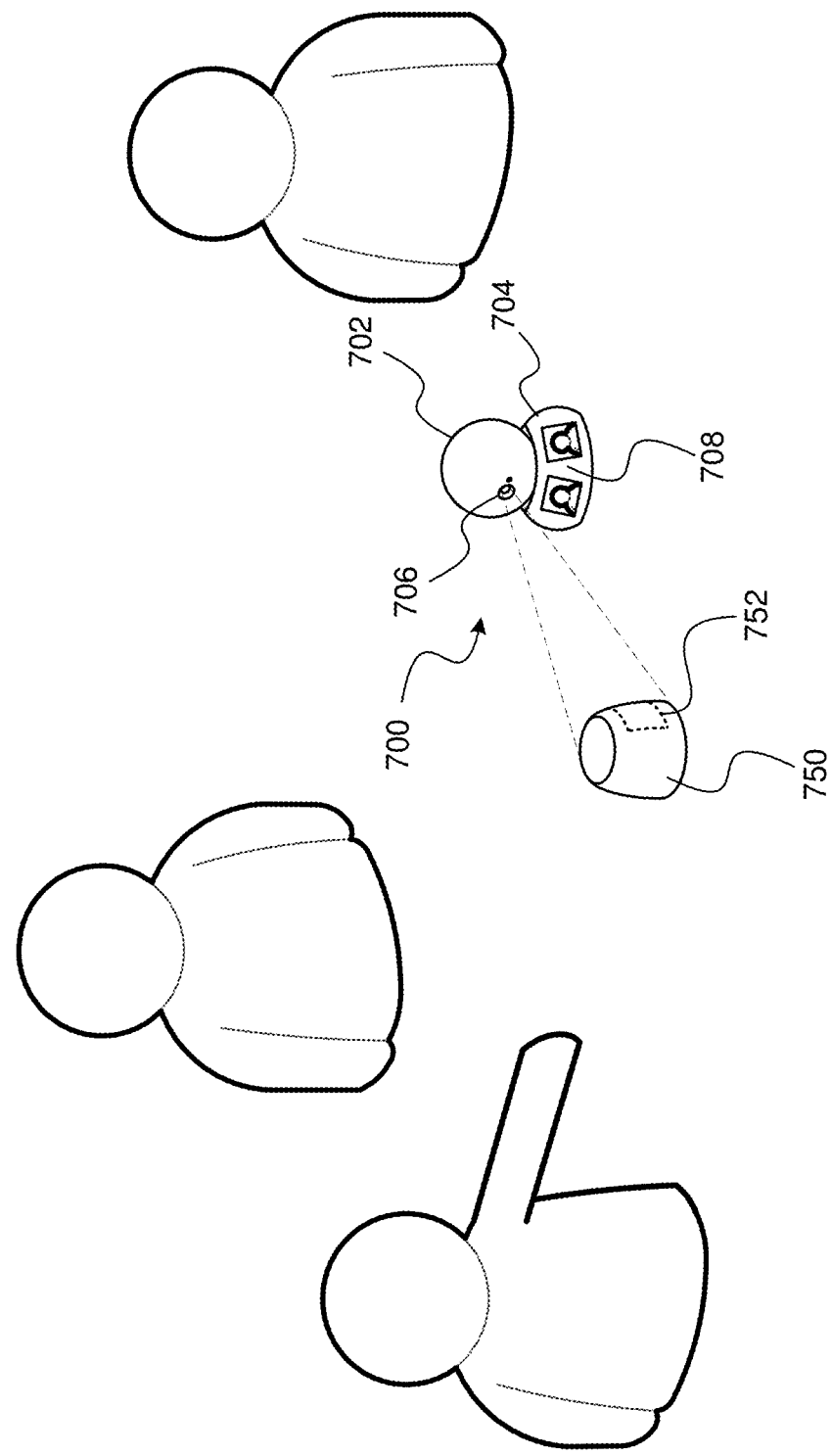

FIGS. 14-15 depict an additional exemplary tele-presence device 700 having a projector 706, in accordance with an embodiment of the present disclosure. A hub 704 of the tele-presence device may further include a display 708 to facilitate the display of video signals corresponding to remote users. As shown, the hub 704 may have a toroidal shape. A camera system 702 of the tele-presence device 700 may be the same camera system as shown in other embodiments of the present disclosure. It is to be understood that the camera system 702 may communicatively couple to multiple different hubs, such as hubs 305, 408, 504, 604, 704, and 804 described herein. For example, a user may have the hub 408 shown in FIGS. 6-10 at their office, and the hub 704 in a conference room. When moving to the conference room for a meeting, for instance, the user may lift the camera system 702 out of the hub 408, and place the camera system 702 on the hub 704 to continue the on-going communication session, or simply to communicatively couple the camera system 702 to the hub 704.

Figure 16:
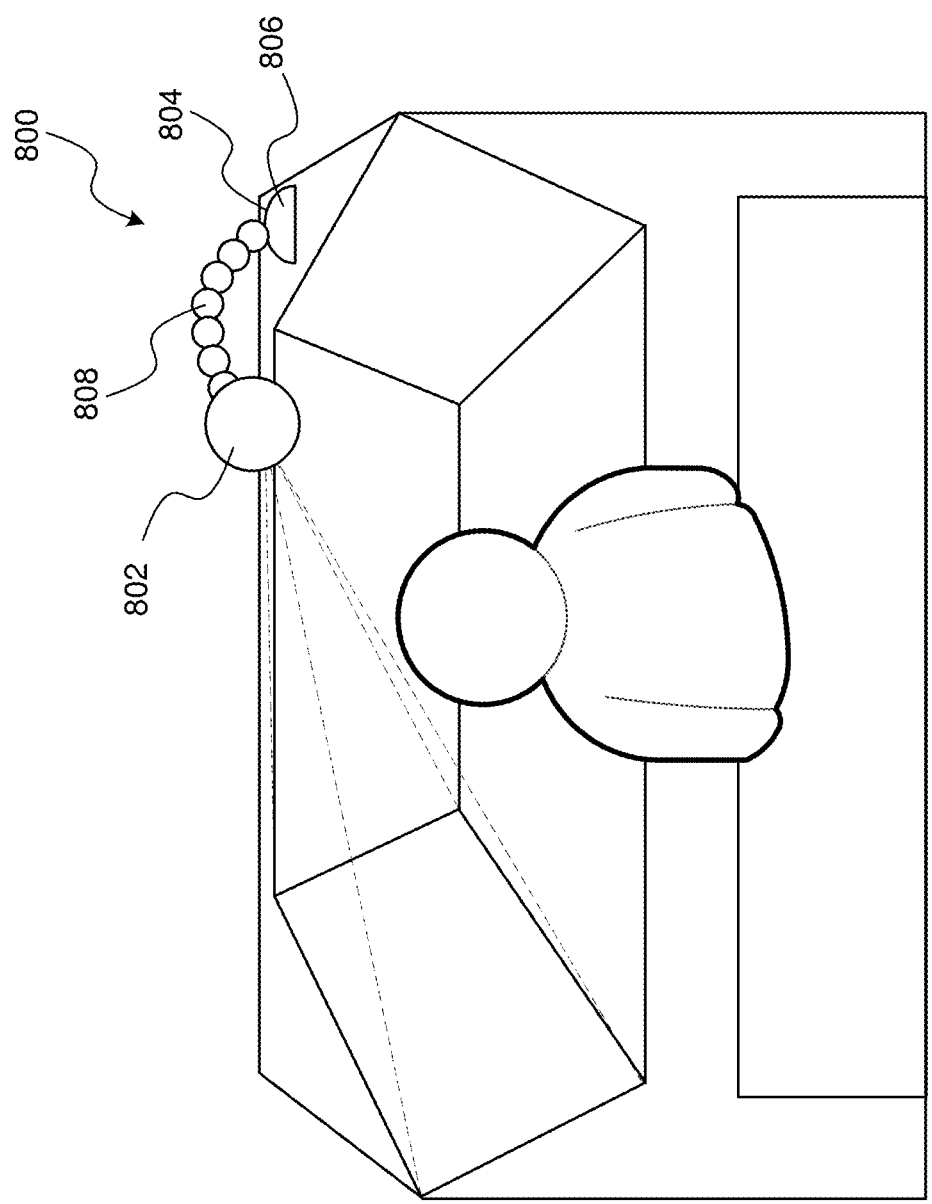

As discussed in greater detail in related U.S. patent application Ser. No. 15/866,358, FIG. 14 shows an example of interactive projection mapping using the tele-presence device 700 having the projector 706 with a projection 710. In some embodiments disclosed herein, the camera system 702 of the tele-presence device 700 has a view 712 which encompasses the projection 714 of the projector 706. As such, a remote user viewing the video signal captured by the camera system may project, via the projector, media onto the visible surface. FIG. 15 illustrates another example of interactive projection mapping using the tele-presence device 700, the interactive projection mapping including, for example, projecting an aesthetic design 752 or skins onto a physical prototype 750. FIG. 16 depicts another exemplary tele-presence device 800 having the camera system 802 and a hub 804. As shown, the hub 804 may include a base 806 coupled to a flexible arm 808. The flexible arm 808 may selectively receive the camera system 802 via magnets or other suitable fastening mechanism.

Figure 17:
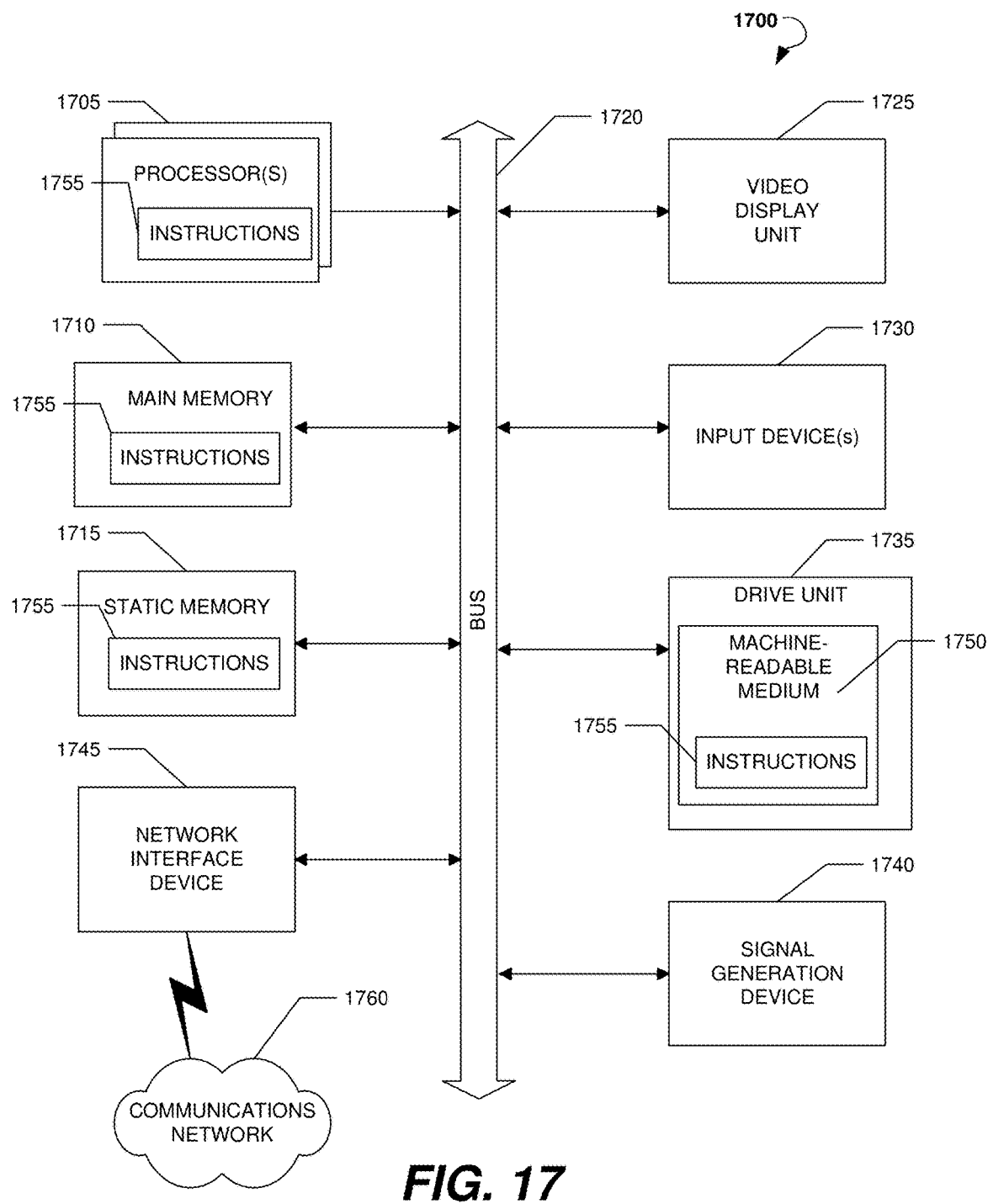
FIG. 17 is a diagrammatic representation of an example machine in the form of a computer system within which a set of instructions for the machine to perform any one or more of the methodologies discussed herein is executed.

FIG. 17 shows a diagrammatic representation of a computing device for a machine in the example electronic form of a computer system 1700, within which a set of instructions for causing the machine to perform any one or more of the methodologies discussed herein can be executed. In example embodiments, the machine operates as a standalone device, or can be connected (e.g., networked) to other machines. In a networked deployment, the machine can operate in the capacity of a server, a client machine in a server-client network environment, or as a peer machine in a peer-to-peer (or distributed) network environment. The machine can be a personal computer (PC), tablet PC, set-top box (STB), cellular telephone, portable music player (e.g., a portable hard drive audio device, such as a Moving Picture Experts Group Audio Layer 3 (MP3) player), web appliance, network router, switch, bridge, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein.

The example computer system 1700 includes a processor or multiple processors 1705 (e.g., a central processing unit (CPU), a graphics processing unit (GPU), or both), and a main memory 1710 and a static memory 1715, which communicate with each other via a bus 1720. The computer system 1700 can further include a video display unit 1725 (e.g., a liquid crystal display (LCD), organic light emitting diode (OLED) display, or a cathode ray tube (CRT)). The computer system 1700 also includes at least one input device 1730, such as an alphanumeric input device (e.g., a keyboard), a cursor control device (e.g., a mouse), a microphone, a digital camera, a video camera, and so forth. The computer system 1700 also includes a disk drive unit 1735, a signal generation device 1740 (e.g., a speaker), and a network interface device 1745.

The drive unit 1735 (also referred to as the disk drive unit 1735) includes a machine-readable medium 1750 (also referred to as a computer-readable medium 1750), which stores one or more sets of instructions and data structures (e.g., instructions 1755) embodying or utilized by any one or more of the methodologies or functions described herein. The instructions 1755 can also reside, completely or at least partially, within the main memory 1710 and/or within the processor(s) 1705 during execution thereof by the computer system 1700. The main memory 1710 and the processor(s) 1705 also constitute machine-readable media.

The instructions 1755 can further be transmitted or received over a communications network 1760 via the network interface device 1745 utilizing any one of a number of well-known transfer protocols (e.g., Hyper Text Transfer Protocol (HTTP), CAN, Serial, and Modbus). The communications network 1760 includes the Internet, local intranet, Personal Area Network (PAN), Local Area Network (LAN), Wide Area Network (WAN), Metropolitan Area Network (MAN), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, Digital Subscriber Line (DSL) connection, Ethernet connection, Integrated Services Digital Network (ISDN) line, cable modem, Asynchronous Transfer Mode (ATM) connection, or an Fiber Distributed Data Interface (FDDI) or Copper Distributed Data Interface (CDDI) connection. Furthermore, communications also includes links to any of a variety of wireless networks including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), Research in Motion, Limited (RIM) duplex paging network, Bluetooth radio, or an IEEE 802.11-based radio frequency network.

While the machine-readable medium 1750 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, the technology for modular virtual reality tracking is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:
1. A tele-presence device comprising:
   a camera system; and
   a hub, communicatively coupled to the camera system, having:
      servo motors configured to rotate the camera system;
      an aperture, the camera system being selectively detachable from the aperture;
      an upper housing having the aperture;
      a lower housing, the upper housing being rotatably coupled to the lower housing;
      a first rotational assembly having a first servo motor of the servo motors and a spindle rotationally driven by the first servo motor, wherein an outer surface of the camera system, in an engaged position, abuts against the spindle; and
      a second rotational assembly having a second servo motor of the servo motors.

2. The tele-presence device as recited in claim 1, wherein the spindle includes a curved cylindrical surface having an inwardly tapered curvature matching a curvature of the outer surface of the camera system.

3. The tele-presence device as recited in claim 1, wherein the second rotational assembly includes a rotational arm coupled to the second servo motor and the upper housing, the upper housing being rotationally driven by the second servo motor via the rotational arm.

4. The tele-presence device as recited in claim 1, further comprising a rail system having a first and a second set of rails disposed on a cylindrical side wall of the upper housing, the rail system securing the first and second rotational assemblies to the upper housing of the hub.

5. The tele-presence device as recited in claim 4, wherein the first servo motor is disposed within a motor mount, the motor mount having a set of slots coupled to the first set of rails.

6. The tele-presence device as recited in claim 4, wherein the second rotational assembly includes a rotational arm having a set of slots coupled to the second set of rails, the rotational arm being rotationally driven by the second servo motor to facilitate rotation of the upper housing and camera system.

7. The tele-presence device as recited in claim 6, wherein the rotational arm is slidably movable along a length of the second set of rails.

8. The tele-presence device as recited in claim 1, the lower housing further comprising a lid having an inner portion, an outer portion, and an intermediate ring disposed concentrically between the inner portion and outer portion, the intermediate ring having an aperture.

9. The tele-presence device as recited in claim 8, wherein the intermediate ring is rotatably coupled to the inner portion via a first interlocking annular groove and to the outer portion via a second interlocking annular groove, the intermediate ring rotating independently of the lower and upper housing.

10. A tele-presence device for spatial communication in a tele-presence system, the tele-presence device comprising:
    a camera system having a camera housing;
    a hub communicatively and rotationally coupled to the camera system, the hub comprising:
       an upper housing having an aperture for removably receiving the camera housing;
       a lower housing rotatable coupled to the upper housing;
       a first rotational assembly having a first servo motor and a spindle rotationally driven by the first servo motor, a surface of the spindle being frictionally engaged to an outer surface of the camera housing; and a second rotational assembly having a second servo motor; and a controller that transmits control signals to the first and the second servo motors.

11. The tele-presence device as recited in claim 10, wherein the upper housing includes a cylindrical side wall, a lid disposed at an upper portion of the cylindrical side wall, and an lower rim disposed at an open lower portion of the cylindrical side wall.

12. The tele-presence device as recited in claim 11, wherein the second servo motor operatively rotates the upper housing, the rotation of the upper housing rotating the camera system about a first axis via a frictional engagement between the camera housing and the aperture.

13. The tele-presence device as recited in claim 11, wherein the aperture is disposed at a center of the lid, the lid having a curved ledge extending radially inward into the aperture, a curvature of the curved ledge matching a curvature of the camera housing.

14. The tele-presence device as recited in claim 10, wherein the camera system is wirelessly coupled to the controller.

15. The tele-presence device as recited in claim 10, wherein the camera housing is spherical.

16. The tele-presence device as recited in claim 10, further comprising at least one of a depth sensor, a projector, an accelerometer, or an inertial measurement unit (IMU).

17. A tele-presence device, comprising:
a camera system;
a hub communicatively and rotationally coupled to the camera system, the hub comprising:
an upper housing having an aperture for removably receiving the camera system;
a lower housing rotatably coupled to the upper housing;
a first rotational assembly having a first servo motor configured to drive rotation of a spindle, the spindle being frictionally engaged with the camera system to facilitate rotation of the camera system about a horizontal axis; and
a second rotational assembly having a second servo motor configured to drive rotation of the upper housing with respect to the lower housing, the aperture being rotationally and frictionally engaged with the camera system to facilitate rotation of the camera system about a vertical axis; and
a controller that transmits control signals to the first and the second servo motors.

* * * * *